Feb. 23, 1932.  B. B. ROCHESTIE ET AL  1,846,571
AUTOMATIC PHOTOGRAPHING APPARATUS
Original Filed May 26, 1928  5 Sheets-Sheet 1
Fig. 1.
Fig. 3.
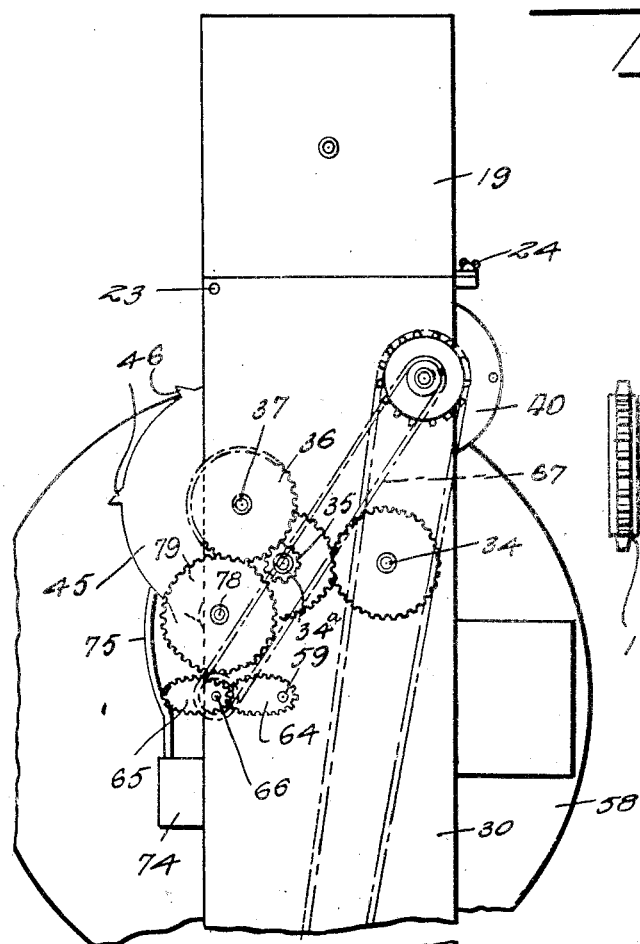
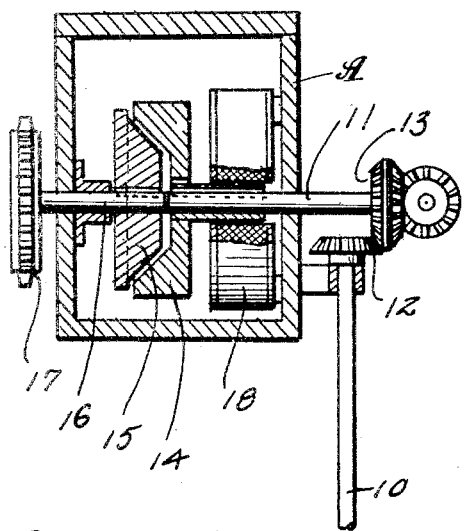
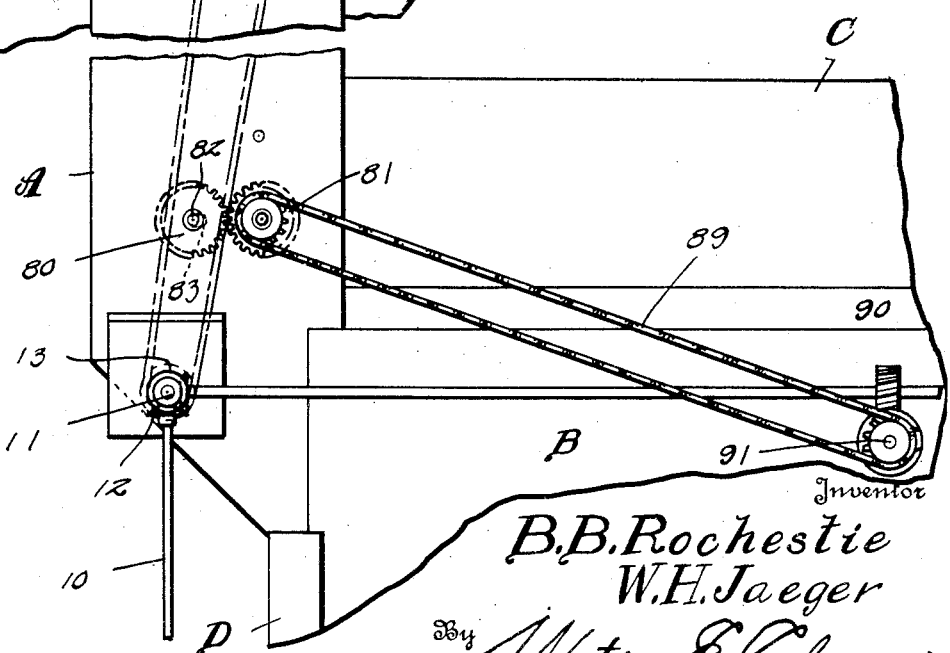
Inventor
B.B. Rochestie
W.H. Jaeger
By Watson E. Coleman
Attorney

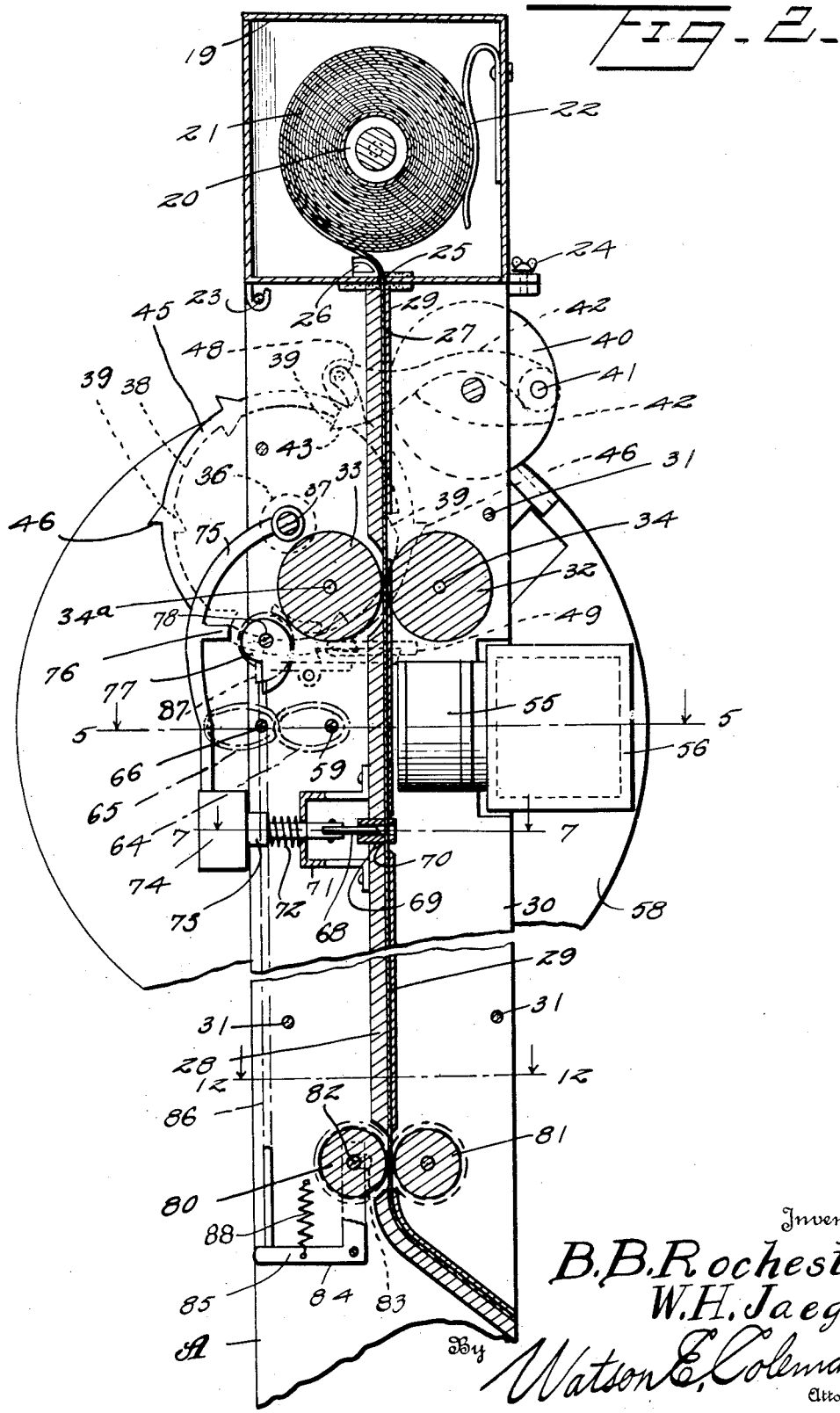

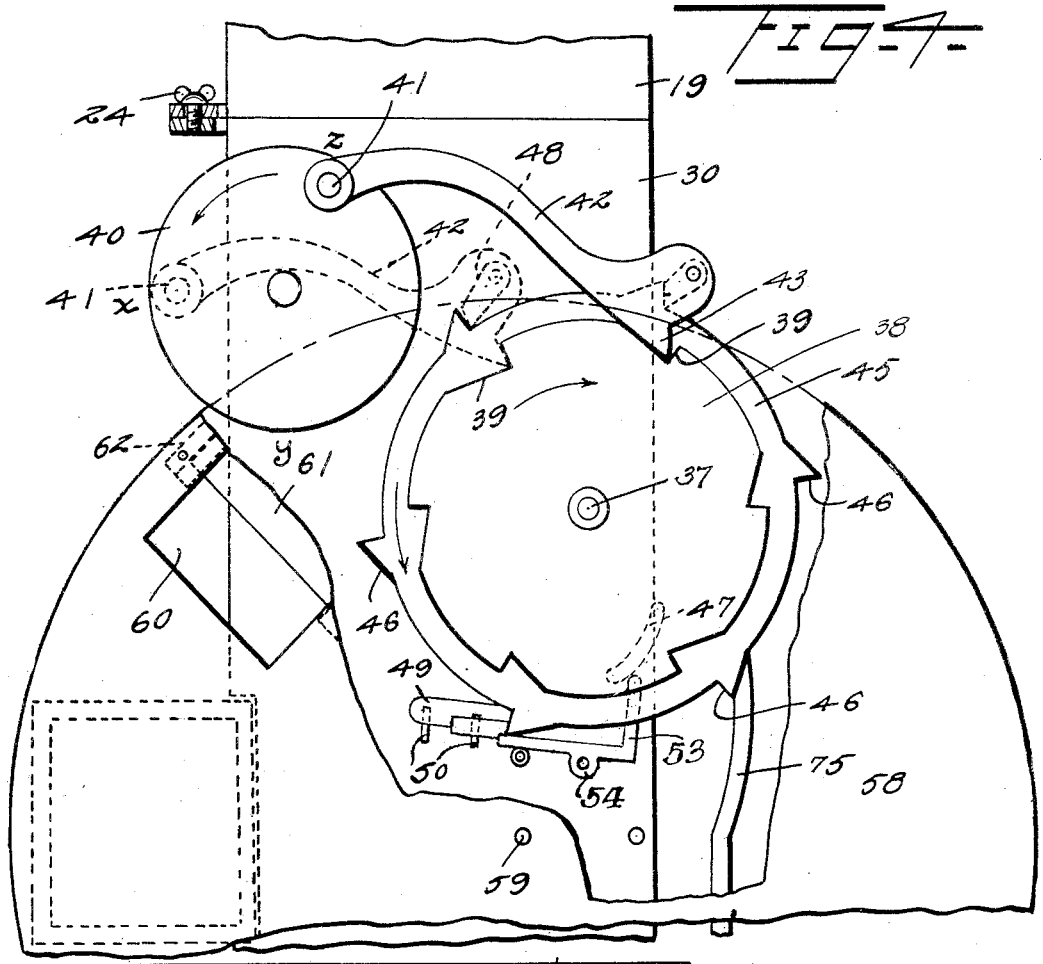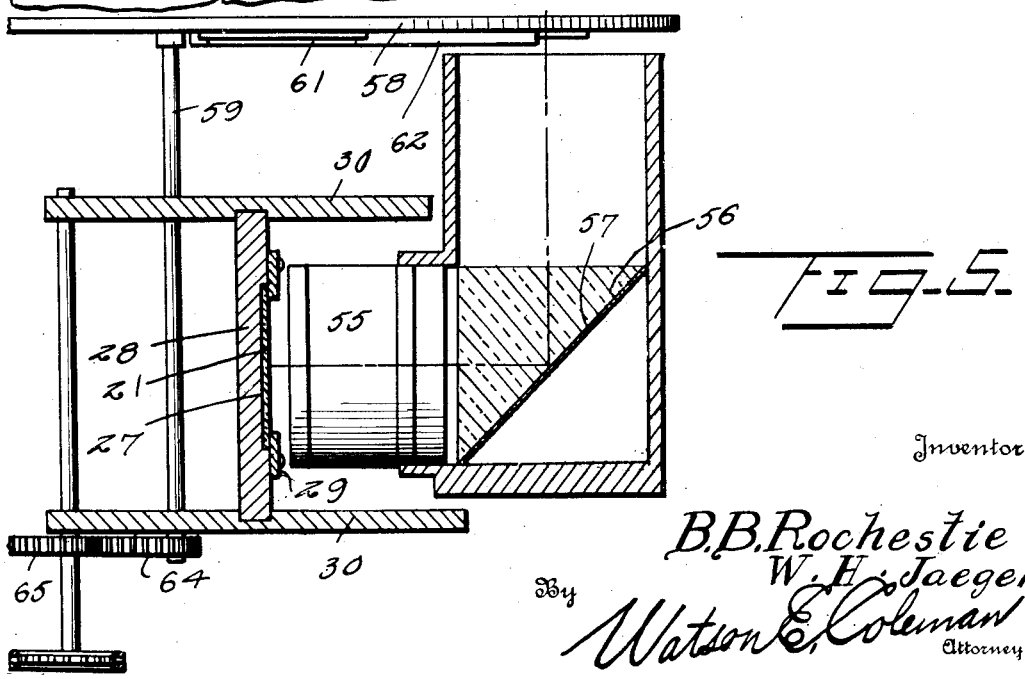

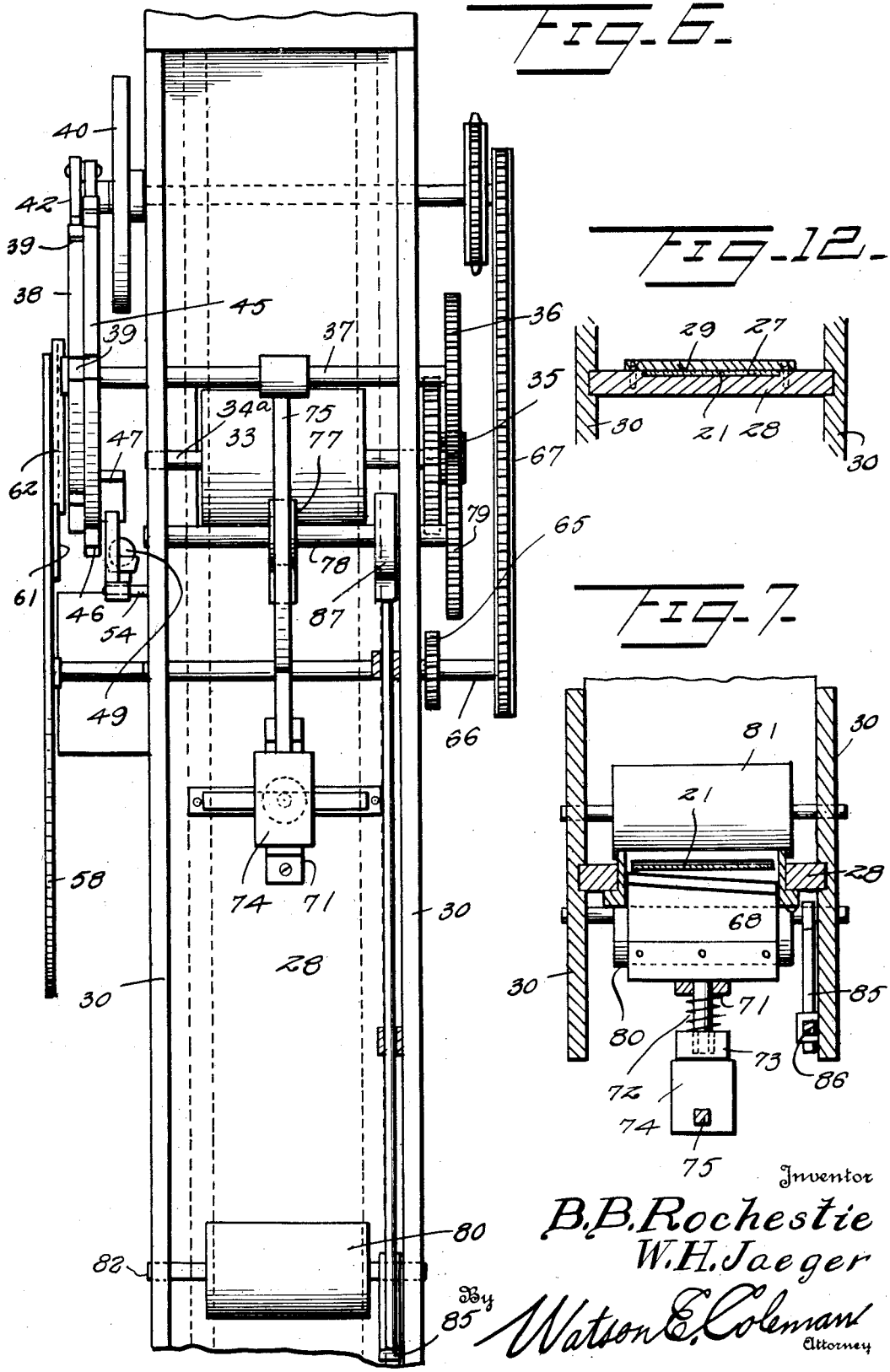

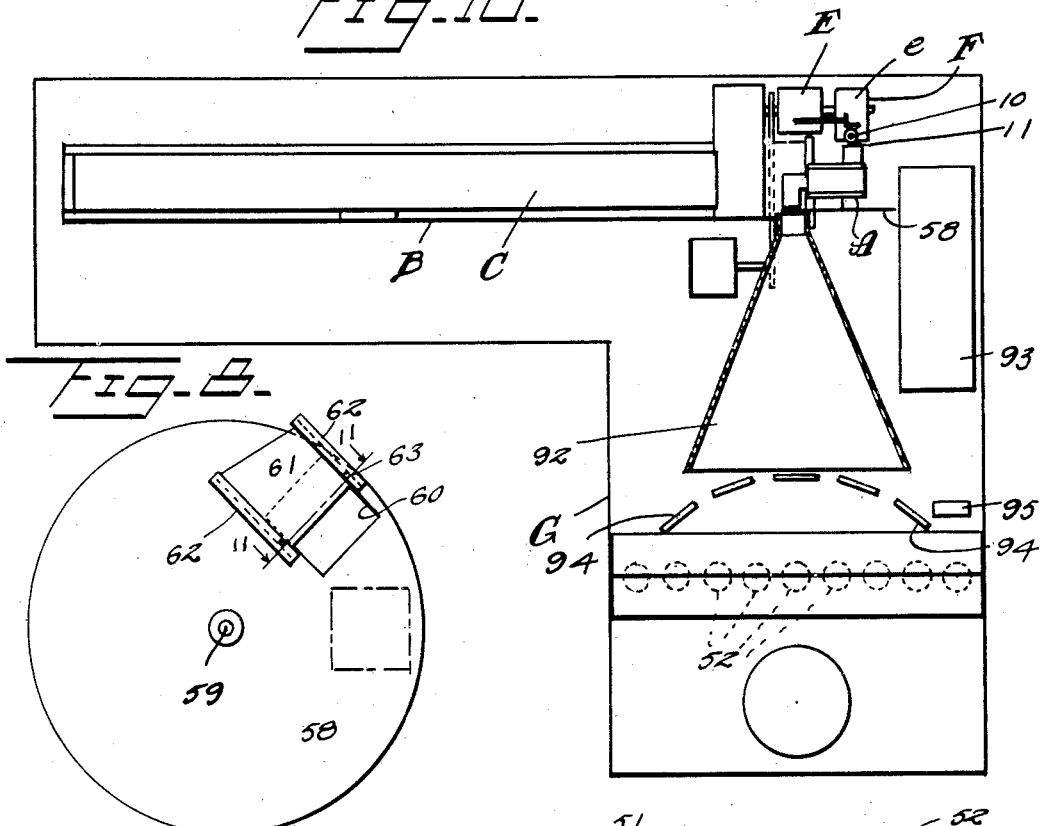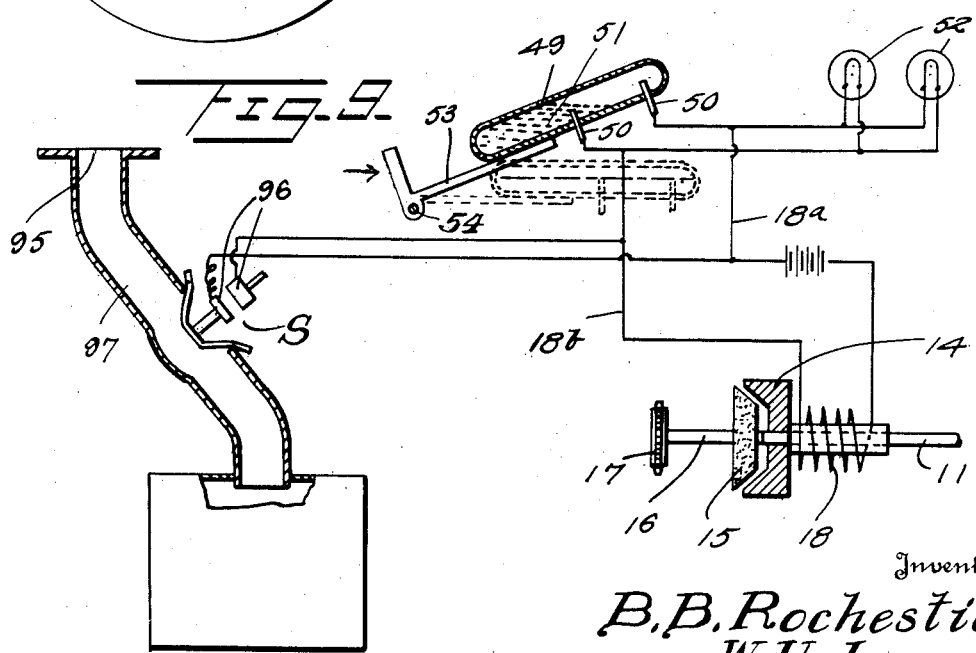

Patented Feb. 23, 1932

1,846,571

UNITED STATES PATENT OFFICE

BARNETT B. ROCHESTIE AND WILLIAM H. JAEGER, OF TRENTON, NEW JERSEY, ASSIGNORS, BY MESNE ASSIGNMENTS, TO PARK PLACE DISCOUNT CO.

AUTOMATIC PHOTOGRAPHING APPARATUS

Application filed May 26, 1928, Serial No. 280,926. Renewed December 4, 1931.

This invention relates to machines for taking photographs automatically upon the deposit of a coin, and particularly to the means whereby a strip of sensitized paper is fed intermittently past a lens and shutter and the means whereby the exposed portion of the sensitized paper strip is cut off from the main body of the strip and carried by a conveyor to the developing, fixing and washing tanks, which latter form the subject of a copending application, Serial #280,925 filed on the 26th day of May, 1928.

The general object of the present invention is to provide means whereby upon the deposit of a coin the lights which illuminate the sitter shall be turned on automatically to permit a first exposure to be taken before the sensitized strip is fed forward, to provide means whereby after a certain period sufficient for one exposure the sensitized strip shall be fed forward step by step or intermittently past the lens and shutter until five exposures have been made and an unexposed portion of the strip is in front of the lens, provide means then operating to automatically cut off the exposed portion of the strip, and then provide for the automatic engagement of the cut off portion of the strip by certain feeding rolls whereby this cut off portion of the strip is shifted to the feeding rolls of the tank system.

A further object of the invention is to provide means whereby a film carton may be readily engaged with or disengaged from the column through which the strip is fed in order to be exposed.

A still further object is to provide a reflecting prism used in connection with the lens so that the pictures upon the paper film of "positive print" paper will not be reversed.

Other objects have to do with the details of construction and arrangement of parts as will appear more fully hereinafter.

Our invention is illustrated in the accompanying drawings, wherein:—

Figure 1 is a fragmentary side elevation of a photographing apparatus constructed in accordance with our invention;

Figure 2 is a vertical sectional view therethrough;

Figure 3 is a section through the casing A showing the electrically actuated clutch;

Figure 4 is a fragmentary elevation of the upper portion of the casing showing the means for feeding the paper strip through the casing and the means for actuating the switch;

Figure 5 is a section on the line 5—5 of Fig. 2;

Fig. 6 is a rear elevation of the casing and the parts supported thereby;

Figure 7 is an enlarged section on the line 7—7 of Figure 2;

Figure 8 is an elevation of the shutter;

Figure 9 is a diagrammatic illustration of the coin actuated means for energizing the clutch and of the electrical connections to the lamps and switch;

Figure 10 is a diagrammatic plan view of the photographic cabinet as a whole;

Figure 11 is a fragmentary section on the line 11—11 of Figure 8;

Figure 12 is a cross sectional view on the line 12—12 of Figure 2.

Referring to the drawings, and particularly to Figure 1 which shows a general view of the construction, A designates the column or vertical casing, which may be made of metal, wood or any other suitable material and through which the paper strip passes vertically downward and which supports the operating mechanism, B designates the tank system through which the cut off portion of the paper strip after it is exposed is passed, and C designates the drier through which the film is passed after it has been developed, fixed and washed. These parts B and C form the subject-matter of the companion application previously referred to. The column A is supported upon any suitable supporting frame D so that the lens opening, or rather the total reflecting prism, will be at a proper height to take a picture of the head and shoulders of a sitter.

A constantly operating electric motor E is used for driving the mechanism, the shaft $e$ of this motor extending into a casing F within which is disposed reduction gearing of any suitable character. Extending upward from the reduction gearing and driven thereby is a shaft 10, which at its upper end is operatively engaged with a shaft 11 as, for instance, through the intermediation of the suitable gear wheels 12 and 13. This shaft 11 operates the conveyor shafts of the tank and also carries upon it the cone-shaped clutch disk 14 (see Figure 3). Confronting this cone-shaped clutch disk is a clutch disk 15 which coacts with the clutch disk 14 but is normally out of engagement therewith, the shaft 16 of this clutch disk carrying upon it the sprocket wheel 17.

Surrounding the shaft 11 is an electromagnetic coil 18. When the circuit through this coil and a source of energy is closed by the deposit of a coin (which coin operated circuit closing means is not illustrated in detail, inasmuch as any means for this purpose may be used), the clutch disk 15 will be attracted and will move toward the clutch disk 14 and the shafts 11 and 16 will operate together. While I have illustrated and prefer to use a magnetic clutch, I do not wish to be limited thereto as any other clutching means may be used for this purpose.

Mounted upon the upper end of the column A is a carton or casing 19 adapted to contain a roll of sensitized paper, that is, a roll of what is known as positive print paper. This casing 19 is rectangular in form and carries therein a reel 20 upon which a strip of paper 21 is wound. A spring 22 attached at one end of the case 19 bears against this strip of paper so as to prevent it unreeling too rapidly and to resist unreeling.

The case 19 at its forward end is provided with a hook 23 whereby it may be engaged with the upper end of the column A and with a screw 24 for the same purpose which engages with an interiorly screw-threaded lug projecting from the column A. By this means the case 19 may be removed when the paper is exhausted and a new case or carton put in place. This case may be made of cardboard, metal or any other suitable material. It is, of course, formed with a slot 25 through which the paper strip is discharged and with a guide 26 having a felt covering over which the paper passes.

The paper passes downward through a relatively narrow chute 27. This, as shown in Figure 12, is formed by a transverse member 28 grooved upon its face to provide the chute 27 and this groove being covered by a transverse plate 29. The member 28 extends transversely of the column A and is engaged in grooves in the side walls 30 of this column, these side walls being held to each other by transverse bolts 31 or in any other suitable manner. We do not wish to be limited to the exact construction of this column, though preferably it is constructed as illustrated in the drawings.

Disposed within the column A below the upper end thereof and engaging with the paper strip 21 are the two opposed feed rolls 32 and 33. These feed rolls are mounted upon shafts 34 and 34a and are geared to each other so that they will turn in the same direction and feed the strip 21 downward between them. The feed roll 33 is positively driven, and to this end the shaft 34a of this feed roll carries upon it the pinion 35 engaged by a gear wheel 36 on a shaft 37. (See Figure 1.)

This shaft in turn carries upon it the ratchet wheel 38, see Figure 4. This wheel, in the embodiment of our invention which has been illustrated, is provided with six teeth 39. Also mounted upon the column is a wheel 40 carrying a wrist pin 41 to which is pivoted an arm or elongated pawl 42. This carries upon it the tooth 43 which is adapted to engage with the ratchet teeth 39. The wheel 40 is operatively driven from the sprocket wheel 17 by any suitable means as shown in Figure 1 and rotates in the direction of the arrow in Figure 4.

It will thus be seen that as the wheel 40 rotates, the arm 42 will be caused to reciprocate and when the crank pin 41 moves downward and forward from a position where the arm 42 is horizontal, this arm 42 will be shifted forward and the wheel 38 will be shifted forward in the direction of the arrow in Figure 4. This will cause a rotation of the feed rolls 32 and 33 in a direction to cause a downward feed of the paper strip to an extent dependent upon the throw of the wrist pin 41. When the wrist pin 41 has made a complete throw in one direction, it will move upward and outward or rearward, retracting the arm 42, at which time the feed ratchet wheel 38 will remain stationary. It is at this time that the exposure is being made. The wheel 38 will remain stationary until the wrist pin 41 has again arrived at its outward position with the arm in a horizontal plane, and then once more the wheel 38 will be given an intermittent forward movement to again feed the strip, and so on.

At the beginning of the operation of taking a series of pictures, the wrist pin 41 will be in the position shown in Figure 4, that is, it will have to move through an arc of 90° from the point z to the point x before starting the movement of the wheel 38. This is done for the reason that, as will hereafter appear, a certain amount of the paper strip is disposed behind the lens in the exposure space, and while the wrist pin 41 is moving from the position z to the position x, this exposure takes place.

In order that the exposure can take place, however, it is, of course, necessary that the lights which illuminate the sitter shall be automatically energized and this occurs immediately that the coin is dropped and the clutch shifted to its clutching position and the disk 40 commences to revolve. To this end, we dispose loosely upon the shaft 37 upon which the ratchet wheel 38 is mounted a disk 45, this disk having ratchet teeth 46 and carrying upon it the somewhat elongated, more or less circumferentially extending cam 47. The pawl arm 42 carries upon it a pivoted pawl 48 which is reversed with relation to the pawl tooth 43, this pivoted pawl tooth 48 engaging the teeth 46 on the disk 45 upon a retractive or outward movement of the arm 42. The arm 42, it will be seen, constitutes a connecting rod carrying upon it the two pawl teeth or pawls 43 and 48, the pawl 43 operating upon the disk 38 upon the forward movement of the rod or arm 42, while the pawl 48 operates upon the teeth 46 of disk 45 upon a reverse movement of the arm or rod 42. The cam 47 constitutes a switch actuating cam.

While we do not wish to be limited to any particular form of switch, we have illustrated for this purpose a mercury switch, designated generally 49, comprising an elongated hollow body of glass or insulating material having extending therein to the electrodes 50 and carrying a body of mercury 51. These electrodes are disposed adjacent one end of the switch so that when the switch 49 is turned into a position angular to the horizontal, the mercury will gravitate to the lower portion of the hollow body 49 and electrical engagement between the two electrodes or contacts 50 will be interrupted. When the hollow body is turned to a horizontal position, the mercury will flow over both contacts 50 and electrical connection will be established between these contacts.

The contacts 50 are electrically connected to a source of current and to the lamps 52 (see Figure 9) which, as will be hereafter described are intended to illuminate the sitter. These lamps may be either projection bulbs or mercury arc lamps. The hollow vessel 49 which carries the mercury is swingingly mounted upon a supporting arm 53 pivoted at 54 at one side of the casing or column A, and at the time when the coin is deposited in the slot and the magnetic clutch operates and wheel 40 starts its movement, the rear end of the cam is in engagement with the arm 53 and the mercury switch is tilted to its "off" position. As soon as the disk 40 commences to move, however, from the point z to the point x, the arm 42 will be drawn rearward and the pawl 48 will engage the teeth 46 of wheel 45 and cam 47 will be drawn past the arm 53, permitting the arm to swing so that the switch will be disposed in a horizontal position and the contacts will be connected to thereby energize the lamps.

Thus while the wrist pin is moving from the point z to the point x, an exposure will be made, then upon the movement of the wrist pin from the point x to the point y, the arm 42 will push the wheel 38 over and cause another feed of the strip 21. Upon the reverse movement of the arm 42, of course, the wheel 45 will be shifted one step but the cam 47 will not again come in contact with the switch supporting arm 53 until after the wheel 45 has made nearly a complete rotation, then the forward end of the cam 47 will strike the arm 53 and shift the mercury switch to its off position.

Disposed on a level below the feeding rolls 32 and 33 is the lens barrel 55. This lens may be of any suitable construction and we have merely illustrated the exterior of the lens barrel without illustrating the lens system. Disposed in front of the lens barrel is the totally reflecting prism, designated generally 56, having the silver-plated reflective back 57. This prism is used so as to secure the correct right and left position of the portrait on the sensitized strip. Inasmuch as these prisms are well known, no further description of the same is required.

Operating across the back of the prism and in a plane, therefore, parallel to the front face of the prism case is a shutter 58. This shutter is mounted upon the shaft 59 and is provided with the opening 60. The area of this opening may be controlled by means of the adjustable slide 61 mounted in guides 62 and illustrated as held in its adjusted position by one or more set screws 63. By adjusting this slide 61, the exposure time may be controlled.

For the purpose of operating the shaft 59 and the shutter, we provide the two coacting elliptical gears 64 and 65, the gear 64 being mounted upon the shaft 59 and the gear 65 upon the shaft 66. The shaft 66 may be driven from any suitable part of the mechanism and is, of course, designed to make one rotation for each complete rotation of the wheel 40. To this end, the shaft 66 may be operatively engaged with the shaft upon which the wheel 40 is mounted. This may be accomplished by providing a sprocket wheel upon this shaft and upon the shaft 66 and a sprocket chain 67 connecting these shafts. By using the elliptical gears 64 and 65, the shutter is given a relatively slow movement of rotation until the shutter opening is about to move across the lens axis and then the shutter is given a very rapid movement. The period of exposure, as previously stated, may be secured by the adjustment of the slide 61 and this period may be from 1/2 of a second to 1/100 of a second or a greater or less amount. These elliptical gears, therefore, secure a quick action of the shutter across the face of the prism and across the lens axis.

It will be remembered that a length of the sensitized strip is initially disposed behind the lens barrel 55 and that the first picture of the series is taken on this forward portion of the strip. Six forward movements of the strip are given by the mechanism which has heretofore been described and at the end of the sixth movement the strip upon which the six pictures have been taken is to be cut off. For this purpose we provide the knife 68. This is mounted in a supporting frame or guide 69 intersected by the paper slot 70.

The knife is guided by the yoke 71. The shank of the knife passes through this yoke, and a spring 72 urges the knife rearward. The extremity of the shank terminates in a knob 73 of soft rubber. For the purpose of driving the knife inward to cut the paper, we provide the hammer or pivotally supported weight 74. This weight 74 is supported upon a curved arm 75, this arm being pivoted in any suitable manner as, for instance, upon the shaft 37. This arm extends outward from the column A and downward to the weight 74 and the arm is provided with an inwardly projecting protuberance or extension 76. This is adapted to be operatively engaged by a cam 77. This cam is mounted upon the shaft 78 (see Figure 6). This shaft at one end carries a gear wheel 79 in meshing engagement with the gear wheel 36.

The cam 77 is of such form that it will support the weight 74 in an outwardly swung position while the strip 21 is being fed downward to expose the six pictures on the strip, and when the wheel 40 has made a complete revolution the cam will permit the arm 75 carrying the weight 74 to swing inward and the weight will strike against the knob and force the knife inward against the action of the spring, thus cutting the strip. Immediately that the wheel 36 commences to move under the action of the arm 42, the cam 77 will act to lift the weight away from the knob 73 and it will remain in this raised position until again six pictures have been taken. Thus after every sixth exposure the knife operates to cut off the strip. Means must be provided for shifting this cut off portion of the strip to the tank into which the strip is developed, washed, fixed and further treated.

It will be seen from Figure 2 that the lower end of the strip slot 27 is downwardly and laterally inclined to deliver the strip into the tank. Of course, it is necessary that no pull should come upon the strip but that the strip should be pushed downward past the lens barrel, the knife, etc., but after the strip has been cut off, the feeding means must be engaged with the strip. To this end, we have provided two feeding rolls 80 and 81, the rolls 80 and 81 having intermeshing gears but normally held apart a very slight distance, a distance just sufficient to permit free passage of the paper strip between the rolls under ordinary circumstances. The shaft 82 of the roll 80 is mounted in a slot 83 and the shaft is supported by means of a yoke 84 having a laterally extending arm 85, constituting a bell crank lever. A push rod 86 extends downward in suitable guides and engages the arm 85 of the bell crank lever, and this push rod is either directly or intermediately operated upon by a cam 87 mounted upon the shaft 78.

During the time that the paper strip is being given a step by step motion past the lens barrel for the purpose of securing the six exposures, the cam 87 will hold the roller 80 spaced from the roller 81 a distance of 25/1000″ or any desired amount, but when the cam 87 has completed one revolution and immediately that the knife has operated, the shoulder on the cam permits the upward movement of the rod 86, the swinging movement of the bell crank lever under the action of the spring 88 causing the rollers 80 and 81 to clamp the film between them.

The roll 81 is continually being driven by means of a sprocket chain 89 going to a sprocket wheel 90 driven from a shaft 91, which in turn is constantly being driven by the motor. It is to be understood that the roll 80 might be driven from any other operating means. The shaft 91 is continually rotating and thus the driving roll 80 is continually rotating but it only affects the strip when the roll 81 is shifted to clamp between the roll 81 and the roll 80 the paper strip.

After the strip has reached the feed rolls 80 and 81, these feed rolls force the strip down onto a conveying means whereby the strip of exposed film having six exposures thereon is transmitted through the several tanks. The mechanism whereby the film is developed, washed, fixed, etc., is fully described and illustrated in our copending application previously referred to, but it may be said that after the film has passed through the several developing, fixing and washing tanks the film is carried through the drier C and is eventually discharged to the sitter in a fully developed and dried condition.

As shown in Figure 9, the coil of the magnetic clutch is connected in circuit with the mercury switch and also with the switch S which is closed by the coin. Thus the tilting back of the mercury switch to its normal position or off position breaks a circuit through the magnetic clutch, which mechanism will be later described. In Figure 10 we have illustrated generally the layout of the different instrumentalities, G designating the cabinet in which the sitter sits in order to have the photograph taken. A hood 92 which as the form of a frusto-pyramid extends nearly to the lens barrel and the tanks and the drying compartment are disposed within an L-shaped compartment leading from the cabinet G.

An ice compartment 93 is disposed within the cabinet whereby cold water, brine or other cooling liquid may be caused to circulate through the cooling coils. A series of mirrors 94 are provided disposed on each side of the hood 92 so as to show the sitter exactly how the portrait will look. The cabinet is provided with a coin-receiving opening 95. Overhead lights previously referred to are disposed within the cabinet G to cast the proper light upon the sitter.

It is obvious that many other different arrangements of the elements of this construction may be devised, that the ice compartment, for instance, might be in the cabinet G or in any other desired place and that the motor might be either within the cabinet or in any other desired position. It will be seen that we have provided a structure wherein upon the deposit of a coin the strip is automatically fed forward six times and that the paper strip of exposed pictures is cut off from the body of the strip and then discharged into the tank. While we have illustrated a construction wherein six pictures are taken upon a paper strip approximately, for instance, 15″ long, it will be obvious that the machine may be modified to take a greater or a less number of pictures upon a strip upon the deposit of a predetermined coin.

While we have illustrated a construction which in actual practice has been found to be very effective, we do not wish to be limited to the details of the structure as the machine may be modified in many ways without departing from the spirit of the invention as defined in the appended claims.

While we do not wish to be limited to the exact means for breaking the circuit through the magnetic clutch, we have illustrated for this purpose the coil 18 as being connected to the wires leading to the illuminating lamps 52, these wires 18a and 18b being also electrically connected to the respective contacts 96 of the switch S urged away from each other by spring means but adapted to be closed by the passage of a coin down the coin chute 97. As the coin is pushed through the coin chute, the contacts 96 are closed for a few seconds or during the time it takes the coin to pass. The mercury switch 49 is at this time in its off position and the mechanism of the camera is stationary.

When the switch 96 is closed, the circuit through the magnetic clutch is closed, which draws together the cones of the clutch and causes the arm 42 to move toward the left in Figure 4, operating the light controlling disk or wheel 45. As soon as this has moved a slight distance, it releases the switch 49 which tilts to its on position, as heretofore described, and in tilting connects the magnetic clutch to the source of electricity. Thus the magnetic clutch continues connected to the source of power even though the switch 96 is opened by the passing of the coin. When six pictures have been taken, the mercury switch 49 is again tilted to its off position and the coil 18 of the magnetic clutch is de-energized coincidently with the headlight circuit being broken. Current is, of course, let in from mains at any convenient point or may be received from any desired source of current.

We claim:—

1. An automatic photographic apparatus including a lens and shutter mechanism, a magazine for supporting a strip of sensitized paper, subject-illuminating means disposed in advance of the lens system, means for feeding the strip and switching on the illuminating means comprising a rotatable wheel, manually actuatable means for operatively connecting the wheel to a driving source, a ratchet wheel, rollers between which the strip passes and having operative driving engagement with the ratchet wheel, an arm reciprocated by the first named wheel and having a pawl engaging the ratchet teeth of the wheel, the arm acting upon a stroke in one direction to turn the ratchet wheel a predetermined amount and upon a reverse stroke to release its engagement with the wheel, a second ratchet wheel having a switch operating means thereon and having ratchet teeth, a pawl carried by said arm acting upon a reverse movement of the arm to engage the second named ratchet wheel with the arm and cause a rotation of the second named ratchet wheel to a predetermined amount, and a switch operated by the switch operating member on the second named ratchet wheel to close a circuit upon an initial movement of the second named ratchet wheel and to open the circuit when said ratchet wheel has made a complete revolution.

2. An automatic photographic appliance including a lens and shutter mechanism, a motor, a wheel, manually actuatable means for operatively engaging the wheel with the motor to cause the motor to drive the wheel, a ratchet wheel, opposed rolls for engaging the strip of film and feeding the same, the rolls being operatively engaged with the ratchet wheel to be driven thereby, an arm pivoted to the first named wheel and having a pawl engaging the teeth on the ratchet wheel, the rotation of the first named wheel acting to reciprocate said pawl, the arm on its forward movement acting to turn the wheel and upon its rearward stroke riding over the ratchet wheel to cause the intermittent feeding of the strip by said rolls, a light operating switch, means acting automatically upon an initial movement of the first named wheel to shift said switch to an on position, and acting automatically after a predetermined number of revolutions of the first named wheel to shift said switch to an off position.

3. An automatic photographic apparatus including a lens and shutter mechanism, a shaft carrying a wrist pin, a motor, manually actuatable means for operatively connecting the shaft to the motor to drive the shaft, an arm carried by the wrist pin and having a pawl, a ratchet wheel having teeth with which the pawl is adapted to engage, the rotation of said shaft causing a reciprocation of the arm and an intermittent rotary movement of the ratchet wheel, strip feeding rolls having operative engagement with the ratchet wheel and driven thereby, subject-illuminating means, and a switch automatically shifted to an on position by the initial actuation of said shaft and automatically shifted to an off position when the shaft has made a predetermined number of revolutions.

4. An automatic photographic apparatus including a lens system and shutter mechanism therefor, a magazine containing a sensitized strip, subject-illuminating means, means for causing the energizing and subsequent de-energizing of the illuminating means and the intermittent feeding of said strip past the lens system comprising a shaft having a wrist pin, manually controlled motor actuated means for driving the shaft, feeding rolls engaging against the film on each side thereof, means for operating the feeding rolls comprising a ratchet wheel having spaced ratchet teeth, the ratchet wheel being operatively geared to said rolls, an arm pivotally mounted upon the wrist pin and having a pawl engaging said ratchet teeth whereby as the arm is reciprocated the ratchet wheel will be given an intermittent step by step movement, means for energizing the illuminating means comprising a switch, a ratchet wheel mounted parallel to the first named wheel but having reversely directed ratchet teeth, said arm having a pawl reversely directed to the first named pawl and engageable with the second named ratchet teeth to give a step by step rotation to the second named ratchet wheel in a direction reverse to the first named wheel, and a member mounted upon the second named ratchet wheel normally holding the switch in open or circuit breaking position but upon an initial movement of the ratchet wheel permitting the switch to close to thereby energize the illuminating means, said member acting to shift the switch to an open position when the ratchet wheel has made a predetermined revolution.

5. An automatic photographic apparatus including a lens and shutter mechanism, means operating automatically upon an initial manual actuation causing the sensitized strip to move step by step intermittently past said lens and causing the operation of the shutter to expose the strip when the strip is stationary, means then acting to cut off the exposed portion of the strip, means then acting to feed the cut-off portion of the strip forward to a discharge point comprising a pair of intergeared rolls disposed one on each side of the strip and beyond the cut-off rollers, one of said rolls being mounted for movement toward and from the other roll, a cam rotating in synchronism with the strip feeding means, a member operatively engaging said movable roll and operatively engaged by said cam, the cam acting to initially move the shiftable roll away from the strip and hold it away from the strip during a complete rotation of the cam, the cam then acting to operatively release the roll to permit the rolls to grip the cut-off portion of the strip, means for driving said rolls, and means urging the movable roll toward the opposite roll against the action of said cam.

6. An automatic photographic apparatus including a vertical column forming a chute along which a strip of paper may be guided, a magazine mounted upon the column and having a reel containing a strip of sensitized paper adapted to be threaded through said chute, feed rolls disposed in the column and extending through the chute and engaging on each side of the strip, a lens system disposed below the feed rolls, a shutter coacting therewith, means operating automatically upon an initial manual actuation acting to intermittently rotate said feed rolls to thus move the strip step by step intermittently past the lens system, an object-illuminating means, an electric switch therefor, means shifting said switch to an on position upon the initial manual actuation, said means acting to shift the switch to an off position after a predetermined length of strip has been fed downward by the feed rolls past the lens system, means mounted upon the column and acting after a predetermined length of strip has been fed between the rolls to cut the exposed portion of the strip from the unexposed portion thereof, and means then automatically engaged with the cut off portion of the strip and acting to feed this cut off portion of the strip out of the lower end of the column.

7. An automatic photographic apparatus comprising a lens carrying member, means to fed a sensitized strip step by step past the lens carrying member, a shutter coacting with the lens carrying member and causing an exposure when the strip is stationary, and means for operating the shutter and controlled by the feeding means comprising two elliptical gears meshing with each other, one of these gears being mounted upon the shutter shaft, and means for driving the other gear from the feeding means.

In testimony whereof we hereunto affix our signatures.

BARNETT BENJ. ROCHESTIE.
WILLIAM H. JAEGER.